United States Patent Office 3,272,968
Patented Sept. 13, 1966

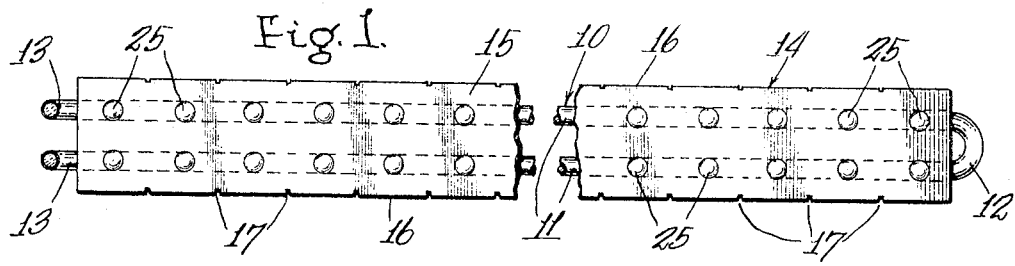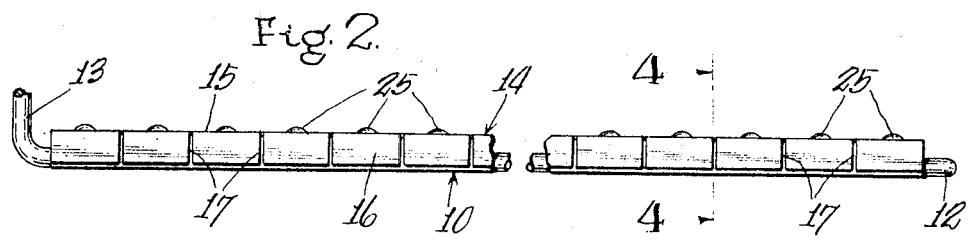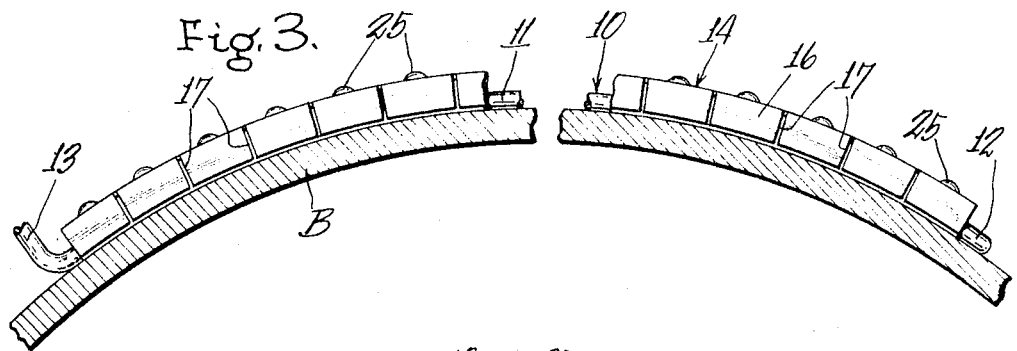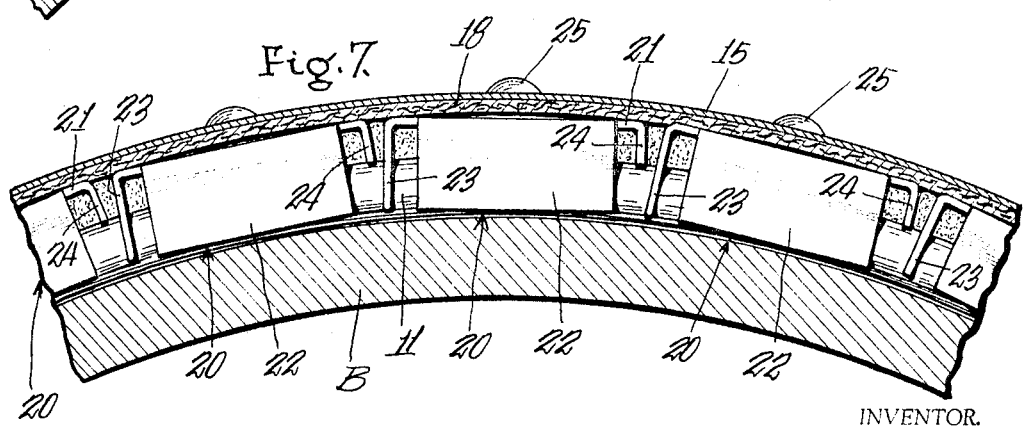
INVENTOR.
JOHN F. VOLKER
BY Williams and Kreske
ATTORNEYS Sept. 13, 1966  J. F. VOLKER  3,272,968
FLEXIBLE ELECTRIC SURFACE HEATING ASSEMBLY
Filed Dec. 5, 1963  2 Sheets-Sheet 2
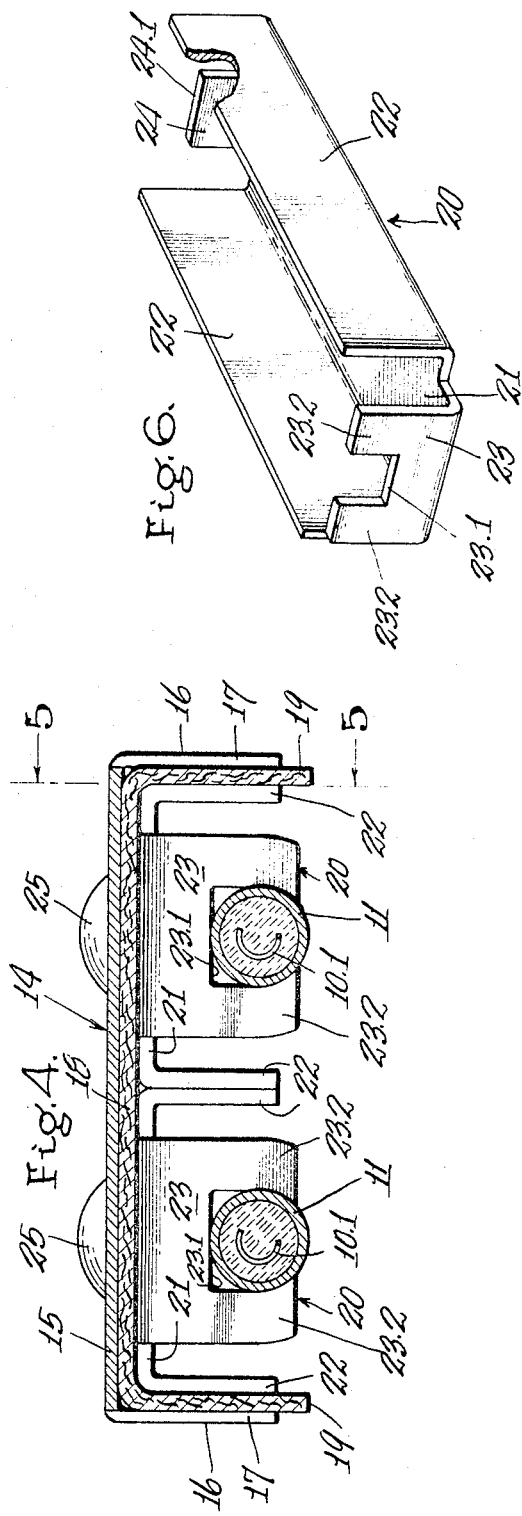
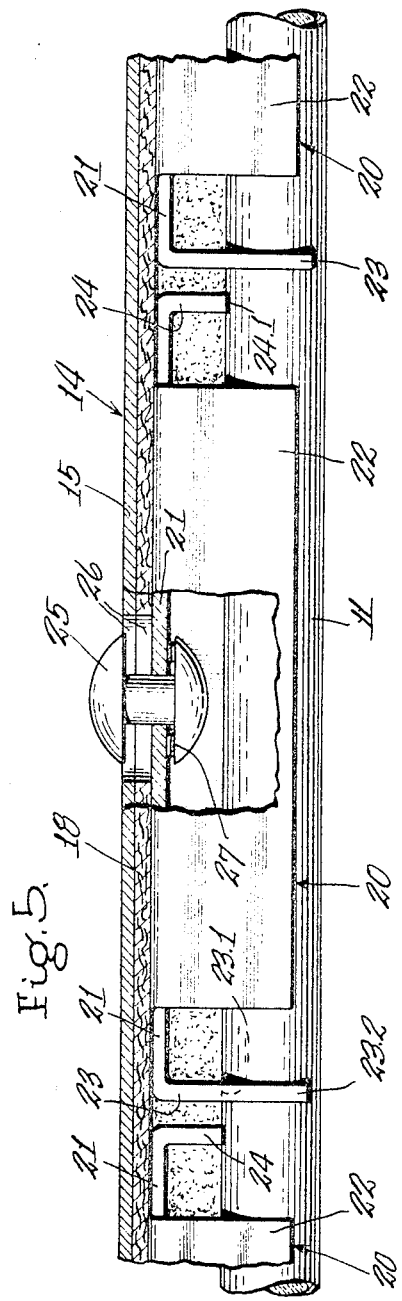
INVENTOR.
JOHN F. VOLKER
BY
Williams and Kreske
ATTORNEYS

3,272,968
FLEXIBLE ELECTRIC SURFACE HEATING ASSEMBLY
John F. Volker, Pittsburgh, Pa., assignor to Edwin L. Wiegand Company, Pittsburgh, Pa.
Filed Dec. 5, 1963, Ser. No. 328,294
8 Claims. (Cl. 219—535)

The present invention relates to electric heating apparatus, particularly to apparatus suitable for temporary application to a body surface which may or may not be planar for heating such surface preparatory to welding, and the principal object of the invention is to provide new and improved heating apparatus of the character described.

The manufacture of tanks, ships and other structures requires the welding together of relatively heavy steel plates. The size of these plates is often such that the heat of the welding operation tends to warp the plates or otherwise induce residual stresses therein unless the plates are preheated before welding. For such preheating, it has been found convenient to clamp elongated electric resistance heating elements to the plates on opposite sides of the intended line of weld and to energize such elements for a sufficient time before welding to raise the temperature of the plates to a sufficiently high level that the further heat produced by the welding operation will not cause plate warpage.

When only flat plates are to be welded, a relatively simple heating element assembly will prove to be adequate. Even when the plates are curved, no particular problem in element assembly design is presented since the assembly will merely be provided with a transverse curvature to match that of the plate to be welded. Difficulties arise, however, when successive plates to be welded have different curvatures or if some are curved and some are straight. Under such circumstances, a satisfactory element assembly must be sufficiently flexible that it can be successively clamped in close conformity to such successively different plates.

The present invention provides an element assembly which is eminently well-suited for clamping to differently curved plates since the assembly has maximum longitudinal flexibility. These and other advantages will readily become apparent from a study of the following description and from the appended drawings, and in these drawings:

FIGURE 1 is a fragmentary, top plan view of an electric heater assembly embodying the present invention, FIGURE 2 is a side elevational view of the assembly seen in FIGURE 1, FIGURE 3 is a view similar to FIGURE 2 but showing application of the assembly to a curved plate, FIGURE 4 is an enlarged, transverse sectional view generally corresponding to the line 4—4 of FIGURE 2, FIGURE 5 is a fragmentary, sectional view generally corresponding to the line 5—5 of FIGURE 4, portions on the near side being broken away to show the underlying structure, FIGURE 6 is a reduced size, fragmentary perspective view of a detail, and FIGURE 7 is a reduced size, fragmentary view similar to FIGURE 5 but with the device applied to a curved plate.

With reference to FIGURES 1 and 2, the embodiment chosen to illustrate the present invention comprises a heating element 10 of the well-known type having a resistor conductor 10.1 embedded in refractory material within a tubular metallic sheath. Element 10 is herein shown formed to a hair-pin configuration to provide legs 11 in side-by-side relation connected together at adjoining ends by a bight portion 12. Terminal ends 13 project transversely of the opposite ends of the element legs 11 in side-by-side relation for connection to an electrical power circuit.

Element legs 11 are disposed within a housing 14 formed by an elongated, channel-shaped, sheet-metal member (see also FIGURE 4) whose web portion 15 provides a closed housing side and whose flange portions 16 are spaced sufficiently to receive the element legs 11 and which flange portions margin an open housing side. For a purpose to appear, housing flange portions 16 are provided with spaced slots 17. As best seen in FIGURE 4, element legs 11 are disposed in the open side of housing 14 and project laterally outwardly of such open side, beyond the margins of the flange portions 16, so as to directly engage the surface of a body to be heated without interference from the housing flanges.

Lining the interior of the housing 14 to limit heat transfer from the element legs 11 to the housing is flexible, heat-resistant material 18 such as asbestos cloth. Material 18 preferably extends at 19 beyond the lower marginal edges of the housing flanges 16 an amount at least substantially equal to the corresponding amount of projection of the element legs 11 for engagement with the surface of the body to be heated. Material portions 19 thus prevent excessive heat loss from the interior of the housing through the space between the lower margins of the housing flanges 16 and the surface of the body being heated. Although not shown, the inner surface of the material 18 may be faced with metallic foil or the like to reflect heat generated by the element legs 11 outwardly through the open housing side to the body being heated.

Means are provided for flexibly mounting the element legs 11 within the housing 14 and for maintaining the desired spaced relationship therebetween, such means comprising a plurality of spacer members 20 interposed between the housing and respective element legs.

As best seen in FIGURE 6, each spacer member 20 is channel-shaped in cross-section to provide a web 21 and spaced flanges 22. Structurally integral with the web portion 21 are fingers 23, 24 at each end of the spacer member, such fingers projecting from the web portion in the same direction as the flange portions 22. Fingers 23, 24 have portions 23.1, 24.1 respectively for bearing against an element leg, such portions being spaced a lesser distance from the member web portion 21 than are the unsupported ends of the member flanges 22 for reasons to appear. Finally, member finger 23 has furcations 23.2 spaced apart sufficiently to receive an element leg 11 therebetween but of a length less than element leg diameter for a purpose to be disclosed.

As best seen in FIGURES 4 and 5, spacer members 20 are adapted to be strung along respective element legs 11 in aligned, side-by-side relation and with the members on each element leg spaced axially a slight distance from adjoining members. Preferably, the space between adjoining members on each element leg coincides with the previously mentioned housing flange slots 17. As illustrated, the spacer members 20 and the housing 14 are orientated in the same direction; i.e., the web portions of each are in adjoining relation with the flange portions of each projecting in the same direction. Note that the spacer members are so disposed that their fingers 23, 24 alternate; that is in each instance, a finger 23 of one member adjoins a finger 24 of an adjoining member.

As viewed in FIGURE 4, each spacer member is secured to its element leg 11 by crimping the finger furcations 23.2 closely thereabout. This arrangement, while tight enough to secure the spacer and the element leg together, is loose enough to permit axial movement therebetween during expansion and contraction of the element during heating and cooling cycles.

The manner in which each spacer member 20 is secured to the housing 14 is seen in FIGURE 5 wherein a rivet 25 extends through aligned apertures in respective spacer member webs 21, the housing member web 15, and the interposed material 18. In order to provide for limited longitudinal movement of the spacer members relative to the housing, the latter and the material 18 may in each instance provide aligned, elongated slots 26 through which the rivet 25 passes.

Under certain conditions and for reasons to appear, it may be necessary to provide for limited relative movement of each spacer member away from the housing web 15. To provide for such movement a spring washer or the like 27 may be interposed beneath one of the heads of each rivet to yieldably take up a small amount of excess length of that portion of the rivet between the rivet heads.

Turning now to FIGURES 3 and 7, the heater assembly is shown lying in close conformity with a curved body B which is to be heated, it being understood that the assembly is normally held against the body by suitable clamps (not shown) which bear against the outwardly facing portion of the housing. The clamping pressure exerted against the housing, therefore will be readily transmitted to the element legs 11 through the longitudinally spaced fingers 23, 24 of the relatively short, closely spaced spacer members 20 to thus cause the element legs to closely conform to the body surface. Since, however, each spacer contacts its element leg but at two axially spaced places, 23.1, 24.1, the element portion intermediate such member finger portions may readily curve to match the body curvature. Contributing to free curvature of the elements as required to conform to the body against which it is pressed, is the fact that but one spacer member finger is crimped to the element.

Since the spacer members 20 are rigid and do not bend with the element and the housing as is clearly illustrated in FIGURE 7, it will be understood that the spacer bodies need be relatively short so that the length of the arc which they subtend is not materially greater than the length of the chord represented by the spacer member. Accordingly, the present spacer members are about two inches in overall length. However, in the event element assemblies need be bent to a greater curvature than presently contemplated, the spacer members could be made shorter. Conversely, if lesser curvatures are required, longer spacer members with an attendant reduction in number thereof required and thus less costly heater assemblies could be made.

In view of the fact that each element leg 11 is gripped at rather closely spaced intervals by respective spacer members and since the latter are each secured to the housing, a curved element assembly can readily be straightened by exerting a straightening force on the housing 14 alone since such force will be transmitted to the element legs.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A body heater assembly to be applied to body surfaces which may be non-planar, comprising an elongated, longitudinally flexible, heat-resistant support member, an elongated, tubular, longitudinally flexible, metallic sheathed, electric resistance heating element generally coextensive with said support member, said element being disposed adjacent to but spaced laterally of said support member and being positioned intermediate the latter and the body to be heated, and a plurality of sheet-metal spacer members in end-to-end relation intermediate said support member and said element for maintaining the spaced relationship therebetween, each spacer member being channel-shaped in cross-section with its web portion disposed adjacent to and parallel with said support member and with other portions projecting transversely of said support member toward said element for engagement with longitudinally spaced element portions.

2. The construction of claim 1 wherein the web portion of each spacer member is secured to said support member and wherein one of the transversely projecting portions of each spacer member is secured to said element.

3. The construction of claim 2 wherein the one transversely projecting portion of each spacer member aforesaid is adjacent the other transversely projecting portion of an adjoining spacer member.

4. The construction of claim 2 wherein said one transversely projecting portion of each spacer member is bifurcated, wherein said element is disposed between the transversely projecting portion furcations, and wherein said element is gripped between said furcations to secure said element to said spacer members.

5. The construction of claim 2 wherein fastening means extends between said support member and each spacer member web portion for securing said members together.

6. The construction of claim 4 wherein said support member is slotted in a direction longitudinally thereof and wherein said fastening means extends through a respective slot to provide for relative longitudinal movement of said support member and said spacer members.

7. The construction of claim 2 wherein said support member forms a housing which is trough-shaped in cross-section with a longitudinally extending closed side and a longitudinally extending open side, wherein spaced side walls margin the open side of said housing, wherein said element is disposed between said housing side walls and protrudes beyond the latter in a direction outwardly of the open housing side for engagement with the surface of the body to be heated, wherein a flexible heat-resistant material is interposed between the interior of said housing and said spacer members to limit heat transfer from said element to said housing, and wherein said material projects beyond said housing side walls in a direction outwardly of said open housing side an amount at least substantially equal to the corresponding amount of projection of said heating element for reducing heat loss from the interior of said housing through the space between said housing side walls and the body surface being heated.

8. The construction of claim 7 wherein said element provides a pair of legs in side-by-side relation and wherein each leg is spaced from said housing closed side by respective spacer members.

References Cited by the Examiner

UNITED STATES PATENTS

| 2,271,977 | 2/1942 | Hjelmgren | 219—536 X |
|---|---|---|---|
| 2,357,150 | 8/1944 | Vogel | 219—463 |
| 2,668,896 | 2/1954 | Husaczka et al. | 219—537 |
| 2,877,332 | 3/1959 | Senior | 219—536 |
| 3,045,098 | 7/1962 | Norton | 219—535 |
| 3,207,887 | 9/1965 | Drugmand et al. | 219—535 |

References Cited by the Applicant

UNITED STATES PATENTS

| 2,632,087 | 3/1953 | D'Harlingue. |
|---|---|---|

ANTHONY BARTIS, *Acting Primary Examiner.*

V. Y. MAYEWSKY, *Assistant Examiner.*